United States Patent [19]

Takahashi et al.

[11] Patent Number: 5,832,895
[45] Date of Patent: Nov. 10, 1998

[54] CONTROL SYSTEM FOR INTERNAL COMBUSTION ENGINE

[75] Inventors: Nobutaka Takahashi, Yokohama; Keisuke Suzuki; Takeaki Obata, both of Kanagawa, all of Japan

[73] Assignee: Nissan Motor Co., Ltd., Kanagawa, Japan

[21] Appl. No.: 901,963

[22] Filed: Jul. 29, 1997

[30] Foreign Application Priority Data

Jul. 30, 1996 [JP] Japan .................................... 8-200424

[51] Int. Cl.$^6$ ...................................................... F02D 41/00
[52] U.S. Cl. ............................................................. 123/350
[58] Field of Search ................................... 123/350, 480, 123/394, 478; 477/97, 110

[56] References Cited

U.S. PATENT DOCUMENTS

| | | | |
|---|---|---|---|
| 5,279,271 | 1/1994 | Hofsaess et al. | 123/350 |
| 5,282,449 | 2/1994 | Takahashi et al. | 123/350 |
| 5,391,127 | 2/1995 | Nishimura | 477/110 |
| 5,467,750 | 11/1995 | Braun et al. | 123/350 |
| 5,694,899 | 12/1997 | Chvatal et al. | 123/350 |

FOREIGN PATENT DOCUMENTS 56-107925  8/1981  Japan .

*Primary Examiner*—Raymond A. Nelli
*Attorney, Agent, or Firm*—McDermott, Will & Emery

[57] ABSTRACT

A control system for an internal combustion engine having an intake air amount regulating device and a fuel supply device. The control system comprises a device for detecting an engine operating condition of the engine, and a control unit. The control unit is configured to perform (a) calculating a basic fuel supply amount of fuel to be supplied to a combustion chamber of the engine in accordance with the engine operating; (b) calculating a lean limit air-fuel ratio in accordance with the engine operating condition, stable combustion in the combustion chamber being impossible at the air-fuel ratio leaner than the lean limit air-fuel ratio; (c) calculating a target intake air amount of intake air to be supplied to the combustion chamber, required for meeting the basic fuel supply amount and the lean limit air-fuel ratio; (d) controlling the intake air amount regulating device so as to regulate an intake air amount of the intake air to the target intake air amount and controlling the fuel supply device so as to regulate a fuel supply amount of the fuel to realize the lean limit air-fuel ratio, within a first engine operating condition (such an engine idling condition) which is within a predetermined low range in engine speed and in engine load; and (e) controlling the intake air amount regulating device so as to increase the intake air amount to fall within a high range between the maximum level and a level lower a predetermined amount than the maximum level and controlling fuel supply device so as to supply the fuel such that the air-fuel ratio falls within a predetermined range, within a second engine operating condition which is higher in at least one of engine speed and engine load than the first engine operating condition.

17 Claims, 16 Drawing Sheets

CONTROL SYSTEM FOR INTERNAL COMBUSTION ENGINE

BACKGROUND OF THE INVENTION

1. Field of the Invention

This invention relates to improvements in a control system for an internal combustion engine, and more particularly to the control system for achieving control of the amount of intake air and the amount of fuel to be supplied to the combustion chambers of the engine which is arranged to control the intake air amount to a target value by regulating the opening degree of a throttle valve under electronic control and to be operated on a lean air-fuel mixture.

2. Description of the Prior Art

Electronic control has been made in most automotive internal combustion engines and accomplished using as important parameters an intake air amount, a fuel supply amount and an air-fuel ratio of air-fuel mixture to be supplied to combustion chambers of the engine. The intake air amount is the amount of intake air to be supplied to the combustion chambers, and the fuel supply amount is the amount of fuel to be supplied to the combustion chambers. It will be understood that if two of the above three parameters are decided, the remaining parameter can be automatically decided.

In a usual gasoline-fueled internal combustion engine, the intake air amount is controlled by a throttle valve whose opening degree changes in mechanically timed relation to operation of the accelerator pedal by a driver. The intake air amount of intake air to be supplied to the combustion chambers is measured or estimated by an airflow meter or an intake manifold pressure sensor. The fuel supply (injection) amount is decided to meet the intake air amount so as to obtain a predetermined air-fuel ratio of air-fuel mixture to be supplied to the combustion chambers. Then, fuel in this fuel injection amount is supplied to the combustion chambers. In summary, first the intake air amount is managed, and then the fuel injection amount is automatically decided in accordance with the managed intake air amount so as to obtain the air-fuel ratio which is separately set. This is a so-called air-initiative control.

However, drawbacks have been encountered in such an engine in which air-fuel ratio is also controlled within a wide range under the air-initiative control. That is, when the air-fuel ratio set in a control unit changes, control of changing the fuel injection amount is accomplished while maintaining the intake air amount at a constant value. However, generated engine torque is generally in proportion to the fuel injection amount to be supplied to the combustion chambers, and therefore the generated torque will unavoidably change without recognition of the driver, providing a feeling of physical disorder to the driver.

Additionally, the intake air amount is controlled in relation to the accelerator pedal operation, and therefore the engine torque is not necessarily generated at an effective point of engine operating conditions of the engine, thereby leaving room for improving fuel economy of the engine.

Otherwise, a similar control has been proposed as disclosed in Japanese Patent Provisional Publication No. 5-6107925. Such a control has been hardly carried out in massproduction internal combustion engines. This control is accomplished as follows: The fuel injection amount is determined corresponding to the accelerator pedal operation of the driver. Then, a target intake air amount is determined in accordance with this fuel injection amount and a set air-fuel ratio. This target intake air amount is realized under operation of an actuator such as an electronically controlled throttle valve whose opening degree is electronically regulated.

However, with this control manner, except when the air-fuel ratio is set at an excessively lean value, it is impossible to increase the intake air amount over the maximum air flow amount of the throttle valve for controlling the intake air amount even if the intake air amount is intended to be controlled to realize the intake air amount obtained as a product of the air-fuel ratio and the fuel injection amount, thereby making it impossible to realize the excessively lean air-fuel ratio. In such a case, if the fuel injection amount is simply increased in accordance with an increase in accelerator pedal operation amount particularly under combustion of stratified charge to accomplish excessively lean air-fuel mixture combustion, air-fuel ratio of the air-fuel mixture around a spark plug becomes too rich to support stable combustion increasing NOx emission, while an average air-fuel ratio within the combustion chamber may not be so enrichen. As a result, stable combustion in each combustion chamber becomes impossible while increasing emission of NOx.

BRIEF SUMMARY OF THE INVENTION

It is an object of the present invention is to provide an improved control system for an internal combustion engine, which effectively overcomes the drawbacks encountered in conventional similar control systems for an internal combustion engine.

Another object of the present invention is to provide an improved control system for an internal combustion engine, which can effectively improve fuel economy and exhaust gas purification performance while achieving a high drivability of the engine.

A further object of the present invention is to provide an improved control system for an internal combustion engine, which can suitably control the intake air amount and the fuel supply amount in accordance with each of engine operating conditions.

An aspect of the present invention resides in a control system for an internal combustion engine having an air intake system and a fuel supply device. The control unit comprises a control unit configured to perform controlling an intake air amount of intake air to be supplied to a combustion chamber of the engine through the intake system and a fuel supply amount of fuel to be supplied to the combustion chamber through the fuel supply device so as to realize a particular air fuel ratio. In a first engine operating condition (such an engine idling condition) which is within a predetermined low range in engine speed and in engine load, the air-fuel ratio is controlled in the vicinity of a lean limit air-fuel ratio, wherein stable combustion in the combustion chamber is impossible at the air-fuel ratio leaner than the lean limit air-fuel ratio. In a second engine operating condition which is higher in at least one of engine speed and engine load than the first engine operating condition, the control unit controls the intake air amount to increase to fall within a high range between the maximum level and at a level which is lower, by a predetermined amount, than the maximum level and the fuel supply amount so that the air-fuel ratio falls within a predetermined range.

Another aspect of the present invention resides, as shown in FIG. 1, in a control system S for an internal combustion engine having an intake air amount regulating device I and a fuel supply device J. The control system S comprises a device A for detecting an engine operating condition of the engine, and a control unit. The control unit is configured to perform the steps of: (a) calculating a basic fuel supply amount of fuel to be supplied to a combustion chamber of the engine in accordance with the engine operating condition, by basic fuel supply amount calculating means B; (b) calculating a lean limit air-fuel ratio in accordance with the engine operating condition by lean limit air-fuel ratio calculating means C, wherein stable combustion in the combustion chamber is impossible at the air-fuel ratio leaner than the lean limit air-fuel ratio; (c) calculating a target intake air amount of intake air to be supplied to the combustion chamber, required for meeting the basic fuel supply amount and the lean limit air-fuel ratio, by target intake air amount calculating means D; (d) controlling the intake air amount regulating device so as to regulate an intake air amount of the intake air to the target intake air amount and controlling the fuel supply device so as to regulate a fuel supply amount of the fuel to realize the lean limit air-fuel ratio, within a first engine operating condition (such an engine idling condition) which is within a predetermined low range in engine speed and in engine load, by first control means E; and (e) controlling the intake air amount regulating device so as to increase the intake air amount to fall within a high range between the maximum level and at a level which is lower, by a predetermined amount, than the maximum level and controlling fuel supply device so as to supply the fuel such that the air-fuel ratio falls within a predetermined range, within a second engine operating condition which is higher in at least one of engine speed and engine load than the first engine operating condition, by second control means F.

The control system of the above aspect is preferably further configured to perform, as indicated by dash-dot lines in FIG. 1, setting the air-fuel ratio in accordance with the engine operating condition, within a third engine operating condition which is higher in at least one of engine load and engine speed than the second engine operating condition, by air-fuel ratio setting means H; and controlling the intake air regulating device and the fuel supply device to regulate the intake air amount and the fuel supply amount so as to obtain the set air-fuel ratio, within the third engine operating condition, by third control means G.

According to the above aspects of the present invention, within the first engine operating condition which is considerably low in engine speed and engine load, it is possible to increase the intake air amount so that the air-fuel ratio exceeds the lean limit air-fuel ratio relative to the fuel supply amount for meeting the required torque. By controlling the intake air amount and the fuel supply amount to realize an air-fuel ratio in the vicinity of the lean limit air-fuel ratio, the exhaust gas purification performance and fuel economy of the engine can be improved to the maximum extent while meeting the required engine torque.

Within the second engine operating condition, the intake air amount can be increased to the maximum extent thereby suppressing the pumping loss to the maximum extent, while the fuel supply amount is controlled to maintain the air-fuel ratio within the predetermined range thereby improving fuel economy throughout a possible wide range of the engine operating conditions and lowering the emission amount of harmful exhaust gas components such as NOx.

DETAILED DESCRIPTION OF THE INVENTION

Figure 1:
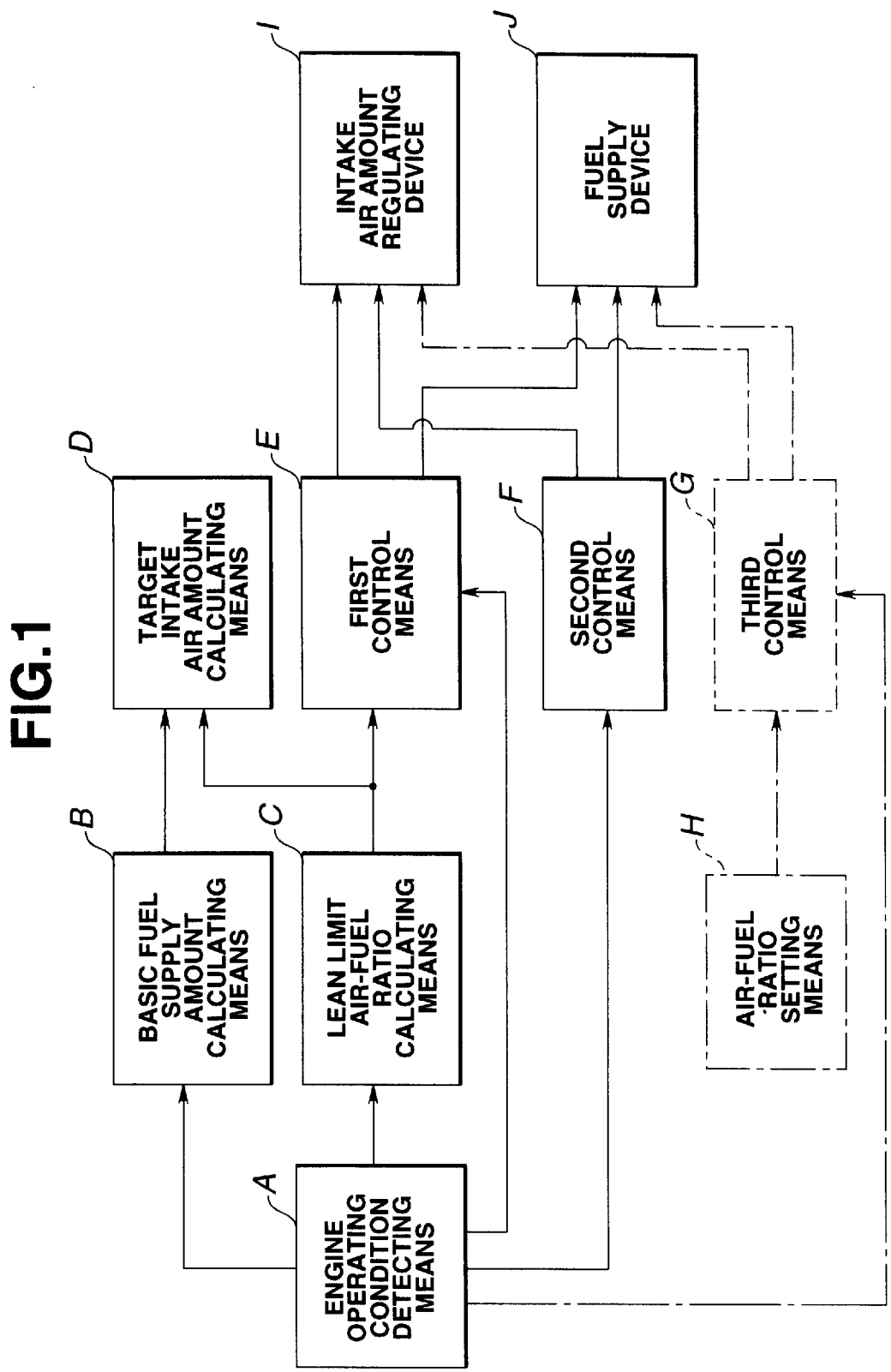
FIG. 1 is a block diagram showing the second aspect of a control system for an internal combustion engine, according to the present invention.
Figure 2:
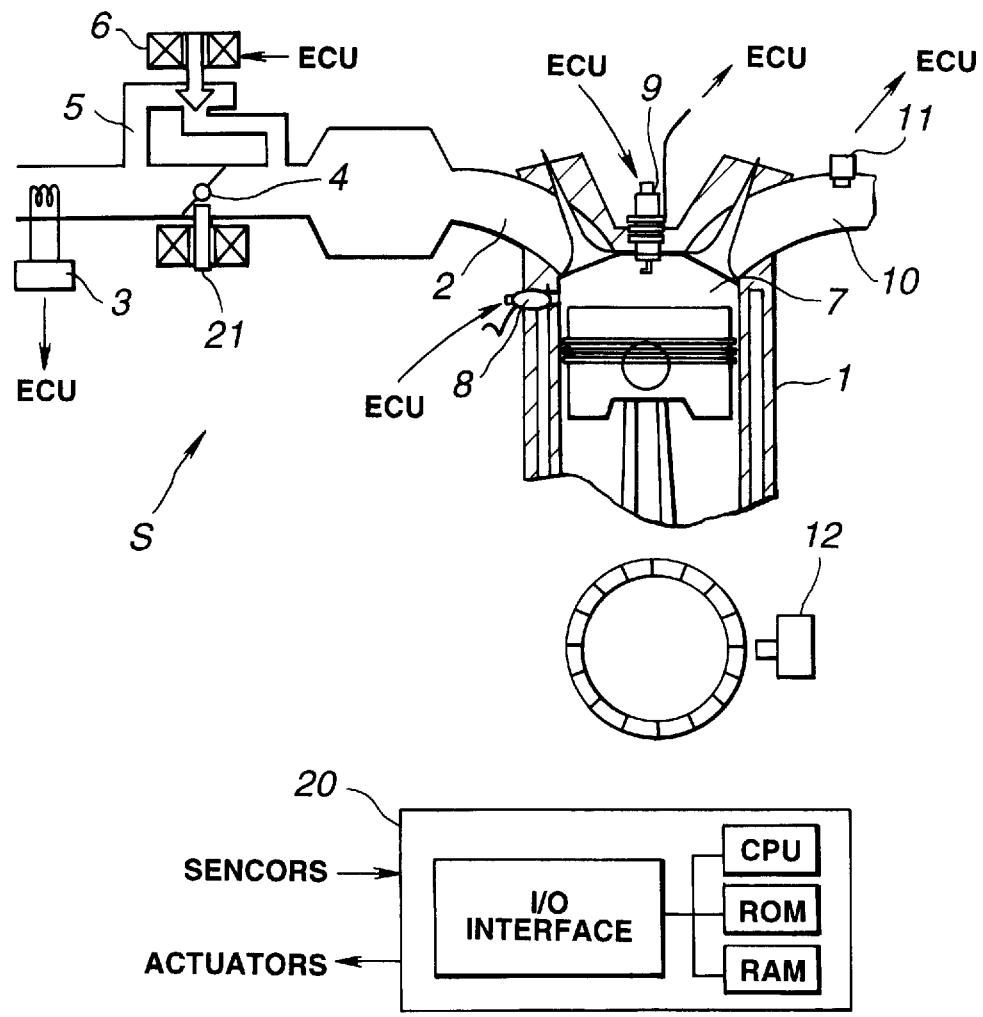
FIG. 2 is a fragmentary schematic illustration of an embodiment of the control system according to the present invention.

Referring now to FIG. 2, an embodiment of a control system for an internal combustion engine 1, is illustrated by the reference character S. The engine 1 is provided with an intake system (not identified) having an air intake passage 2 through which air is sucked into combustion chambers 7 (only one of which is shown). An airflow meter 3 is provided in the air intake passage 2 to detect an intake air amount Q which is the amount of air flowing through the air intake passage 2. The intake air amount Q is controlled by a throttle valve or intake air amount regulating device 4 which is disposed in the air intake passage 2 and operated by a throttle actuator 21. An auxiliary air passage 5 is formed bypassing the throttle valve 4. More specifically, the auxiliary air passage 5 has upstream and downstream ends which are respectively connected to a portion of the air intake passage 2 upstream of the throttle valve 4 and another portion of the air intake passage downstream of the throttle valve 4 relative to flow of air through the air intake passage 2. An auxiliary air amount control valve 6 is disposed in the auxiliary air passage 5 to control the amount of air flowing through the auxiliary air passage 5.

A fuel injector valve or fuel supply device 8 is fixed to the cylinder block of the engine 1 to inject fuel into each combustion chamber 7. Additionally, a spark plug 9 is disposed in each combustion chamber 7 to ignite air-fuel mixture to be supplied into the combustion chamber 7 thereby accomplishing a spark ignition. The air-fuel mixture is formed by mixing air inducted through the air intake passage 2 and fuel injected from the fuel injector valve 8. Since fuel is directly injected from the fuel injector 8 into the combustion chamber 7, it is possible to form a stratified charge (air-fuel mixture) including a layer of air-fuel mixture and an air layer and to accomplish combustion of the stratified charge within the combustion chamber. In this embodiment, the engine 1 is arranged to make the stratified combustion in a low load engine operating range. An air-fuel ratio (oxygen concentration) sensor 11 is disposed in an exhaust gas passage 10 through which exhaust gas from the combustion chamber 7 is discharged out of the engine 1. The air-fuel ratio sensor 11 is adapted to sense the concentration of oxygen in exhaust gas thereby detecting air-fuel ratio of the air-fuel mixture supplied to the combustion chamber 7 of the engine 1.

Additionally, a crank angle sensor 12 is provided to detect an angular position of an engine crankshaft (not shown) and an engine speed Ne. An engine coolant sensor and the like are provided to detect a temperature of engine coolant of the engine 1, though not shown.

Each of the sensors is adapted to output electrical signal representative of a sensed matter or engine operating condition. Such signals from the sensors are input to an electronic control unit (ECU) 20. The control unit 20 is adapted to generate command signals based on the electrical signals from the sensors and output the command signals respectively to the throttle actuator 21, the auxiliary air amount control valve 6, the fuel injector valve 8, the spark plug 9 and the like as actuators, thereby accomplishing a variety of control of the engine 1.

Next, a manner of operation of the above control system S will be discussed.

Pumping loss due to intake air to be supplied to the combustion chamber 7 is reduced as air-fuel mixture to be supplied to the combustion chamber 7 becomes lean, so that the amount of fuel required to obtain the same engine torque can be reduced as compared with engines of the type to be supplied with homogenous air-fuel mixture. Accordingly, the engine 1 can be improved in fuel economy.

In case of a normal spark-ignition internal combustion engine of the type wherein fuel such as gasoline is injected into an intake port to form homogenous air-fuel mixture (uniform in air-fuel ratio) in a combustion chamber, an air-fuel ratio of about 25:1 becomes a lean burn limit for supporting stable combustion in the combustion chamber. In contrast, the engine 1 in this embodiment is arranged to directly inject fuel into the combustion chamber 7 to form air-fuel mixture only in an area surrounding the spark plug 9 so that an air layer is positioned in other areas, thus forming the stratified charge. Accordingly, a readily combustible air-fuel mixture resides around the spark plug 9, but a lean air-fuel mixture condition can be maintained as a whole in the combustion chamber 7 so that an average air-fuel ratio in the combustion chamber 7 is kept in a lean condition (relative to the stoichiometric air-fuel ratio). Thus, the engine 1 can achieve a so-called lean burn, thereby further improving fuel economy.

In case of operating the engine 1 under a stratified charge condition, the amount of fuel to be supplied to the engine 1 is relatively small even when the amount of intake air to be supplied to the engine 1 is increased to the maximum level, so that engine torque generated is reduced as compared with a case in which the engine is operated under homogeneous air-fuel mixture. Accordingly, the engine 1 is usually operated under the stratified charge condition when a relatively low engine load is required, and under the homogenous air-fuel mixture condition when a relatively high engine load is required. Under such a homogenous air-fuel mixture condition, the homogenous air-fuel mixture is uniformly filled throughout the whole combustion chamber 7. Thus, the control system S of this embodiment is arranged to maintain air-fuel ratio of air-fuel mixture to be supplied to the engine at a level for obtaining secure and stable combustion in the combustion chamber, while causing a required engine torque to be effectively generated.

Hereinafter, a manner of control accomplished by the control system S of this embodiment will be discussed with reference to FIGS. 3 to 13.

Figure 3:
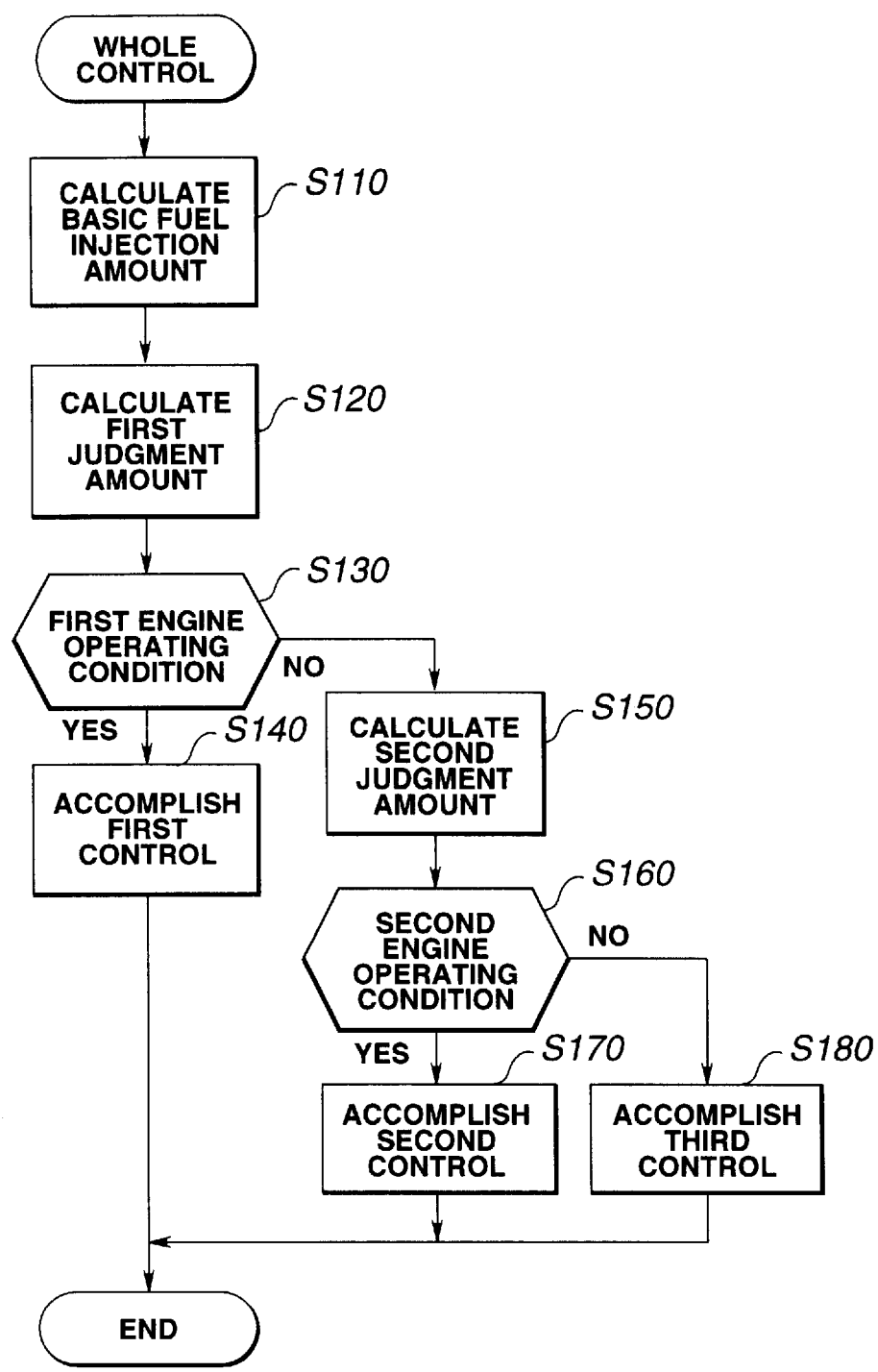
FIG. 3 is a flowchart showing the main routine (whole control) of a control accomplished by the control system of FIG. 2.

A flowchart illustrating the whole control or main routine of the control system S is shown in FIG. 3.

At a step S110, a basic fuel injection amount is calculated in accordance with a required engine torque of the engine 1. The basic fuel injection amount is the basic amount of fuel to be injected from the fuel injector valve 8.

At a step S120, a (first) judgment standard amount of a first engine operating condition is calculated.

At a step S130, a judgment is made as to whether the present engine operating condition corresponds to the first engine operating condition or not in accordance with the calculated judgment standard amount of the first engine operating condition. If it corresponds to the first engine operating condition, the flow goes to a step S140 at which a first control suitable for the first engine operating condition is accomplished. If it does not correspond to the first engine operating condition, the flow goes to a step S150 at which a (second) amount of a second engine operating condition is calculated.

At a step S160, a judgment is made as to whether the present engine operating condition corresponds to the second engine operating condition or not in accordance with the calculated amount of the second engine operating condition. At this time, only in case that the present engine operating condition corresponds to the second engine operating condition while the present engine operating condition has been judged not to correspond to the first engine operating condition at the step S130 though the second engine operating condition includes the first engine operating condition, the flow goes to a step S170 at which a second control suitable for the second engine operating condition is accomplished.

If the judgment is so made that the present engine operating condition does not correspond either to the second engine operating condition at the step S160, the flow goes to a step S180 at which a third control suitable for a third engine operating condition is accomplished.

Subsequently, each step of the above main routine will be discussed in detail with reference to flowcharts of FIGS. 4, 6, 10, 12, 13 and 14 showing sub-routines.

Figure 4:
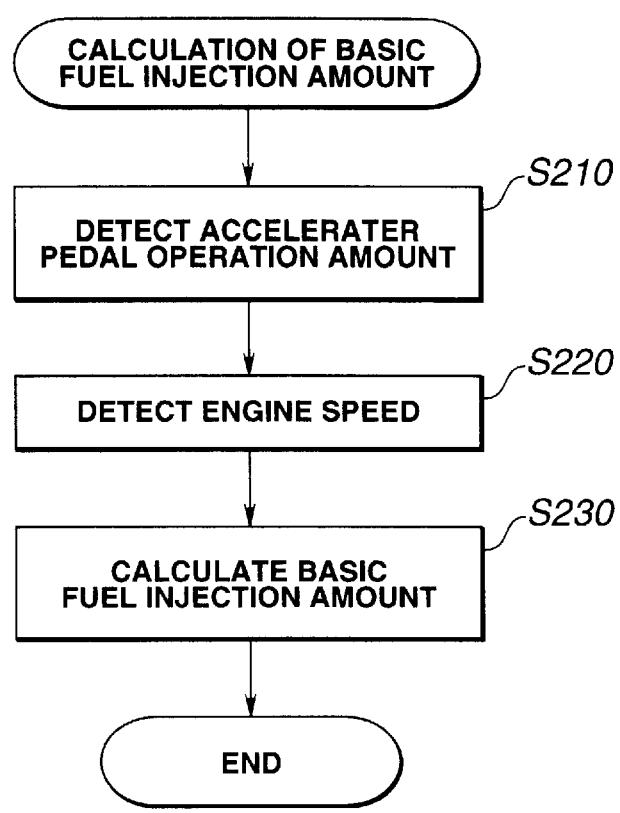
FIG. 4 is a flowchart showing a routine for calculation of a basic fuel injection amount in connection with the control system of FIG. 2.

FIG. 4 is the flowchart showing the detail of calculation of the basic fuel injection amount at the step S110.

At a step S210, the amount of operation of an accelerator pedal (not shown) by a driver is read. More specifically, the accelerator pedal operation amount is detected by a sensor such as a potentiometer connected to the accelerator pedal.

At a step S220, an engine speed Ne is detected. More specifically, the engine speed (the number of revolution of the engine crankshaft per unit time) Ne is detected by measuring an output cycle of each standard signal output at a standard crank angle (or at intervals of crank angle 720°/n where n is the number of engine cylinders) from the crank angle sensor 12. It is not necessary to directly detect the engine speed Ne at this step S220, so that the engine speed Ne which is calculated in other signal processing routine may be read.

Figure 5:
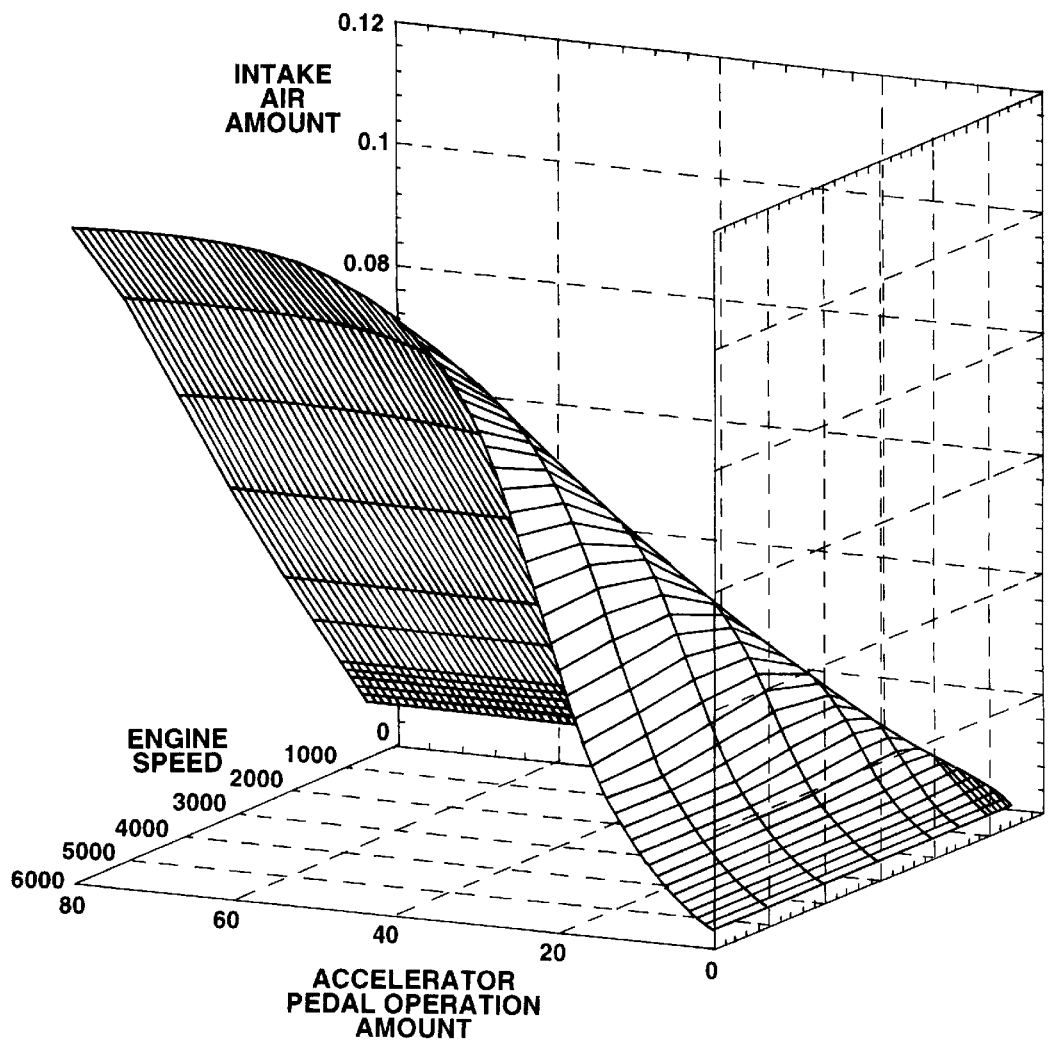
FIG. 5 is a graph showing the characteristics of a target intake air amount in terms of an accelerator pedal operation amount and an engine speed, in connection with the control system of FIG. 2.

At a step S230, the basic fuel injection amount corresponding to a target engine torque required by the driver is calculated in accordance with the above-mentioned acceleration pedal operation amount and the above-mentioned engine speed Ne upon searching a map or the like whose one example is shown in FIG. 5.

The map of FIG. 5 shows the characteristics of intake air amount (mass) of a standard and desirable normal internal combustion engine per unit time in terms of the accelerator pedal operation amount and the engine speed Ne. The amount (mass) of air to be sucked into each engine cylinder on each intake stroke is obtained by dividing this intake air amount per unit time by the engine speed. In this regard, the basic fuel injection amount (based on the stoichiometric air fuel ratio) of fuel to be supplied on each intake stroke is 1/14.7 (the stoichiometric air-fuel ratio) of the above-mentioned amount of air to be sucked into each engine cylinder. In accordance with the above, a map of the basic fuel injection amount is set using the accelerator pedal operation amount and the engine speed as parameters. The basic fuel injection amount is searched from the map.

Otherwise, a map of the required engine torque using the accelerator pedal operation amount and the engine speed as parameters and another map of the basic fuel injection amount corresponding to the required engine torque may be prepared. In this case, the required engine torque is searched from the former map in accordance with the acceleration pedal operation amount and the engine speed; and then the basic fuel injection amount corresponding to the required engine torque is searched from the latter map.

Figure 6:
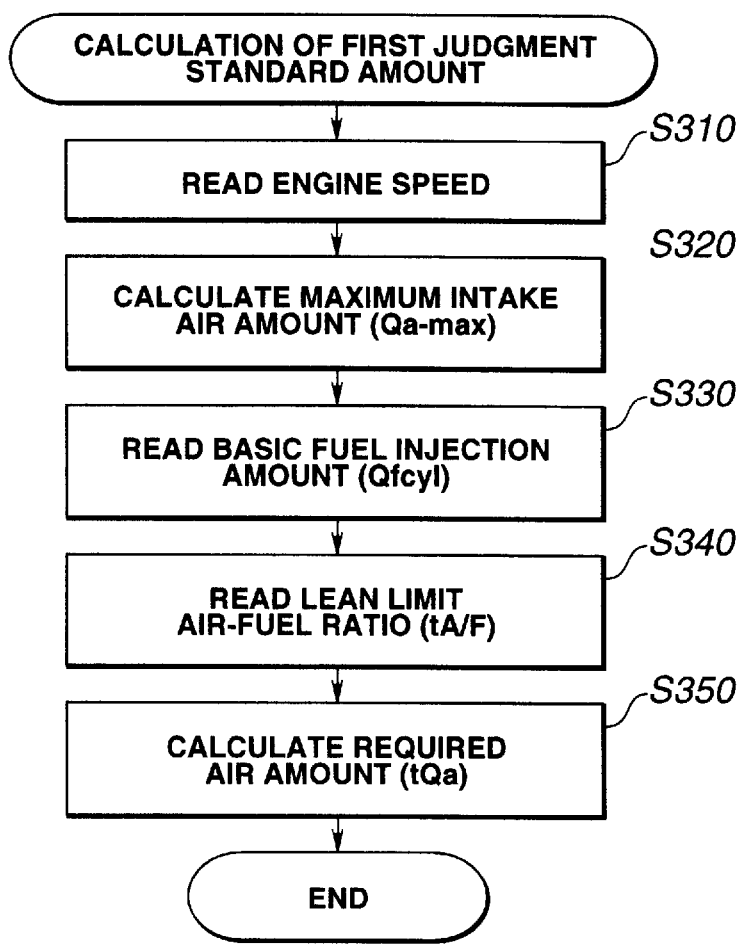
FIG. 6 is a flowchart showing a routine for calculation of a first judgment standard amount, in connection with the control system of FIG. 2.

FIG. 6 is the flowchart showing the detail of the calculation of the (first) judgment standard amount of the first engine operating condition at the step S120 in FIG. 3.

At a step S310, the engine speed Ne is read.

Figure 7:
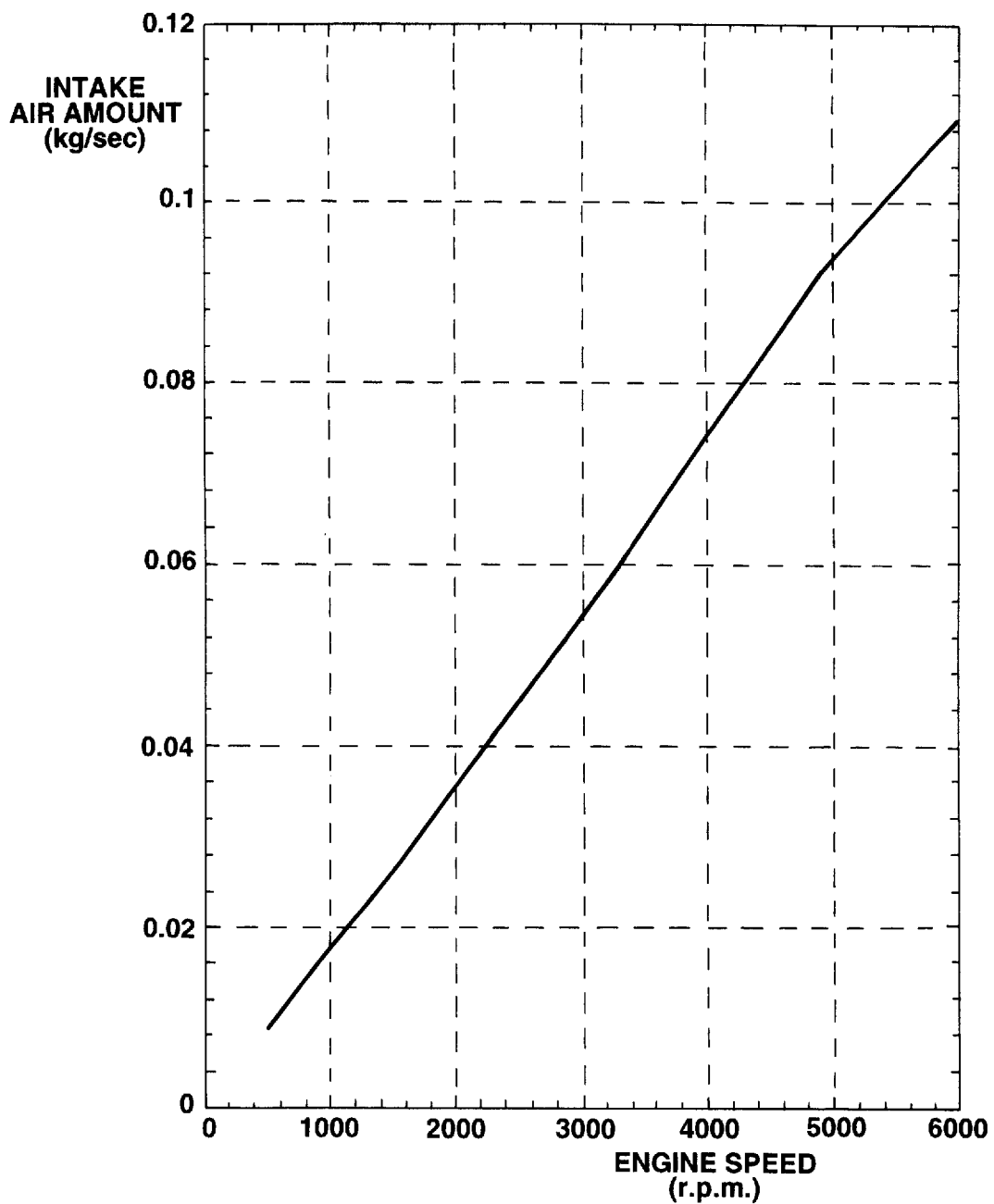
FIG. 7 is a graph showing the relationship between the intake air amount and the engine speed, in connection with the control system of FIG. 2.

At a step S320, a maximum intake air amount Qa-max (the maximum value of the intake air amount Qa) which is suppliable per unit time at the present engine speed Ne read at the step S310 is obtained, for example, by searching a map having a characteristics shown in FIG. 7. The characteristics of FIG. 7 is obtained by cutting out the characteristics at the fully opened state of the throttle valve, from the characteristics as shown in FIG. 5 for the engine 1.

At a step S330, the basic fuel injection amount calculated at the step S230 in FIG. 4 is read.

Figure 8:
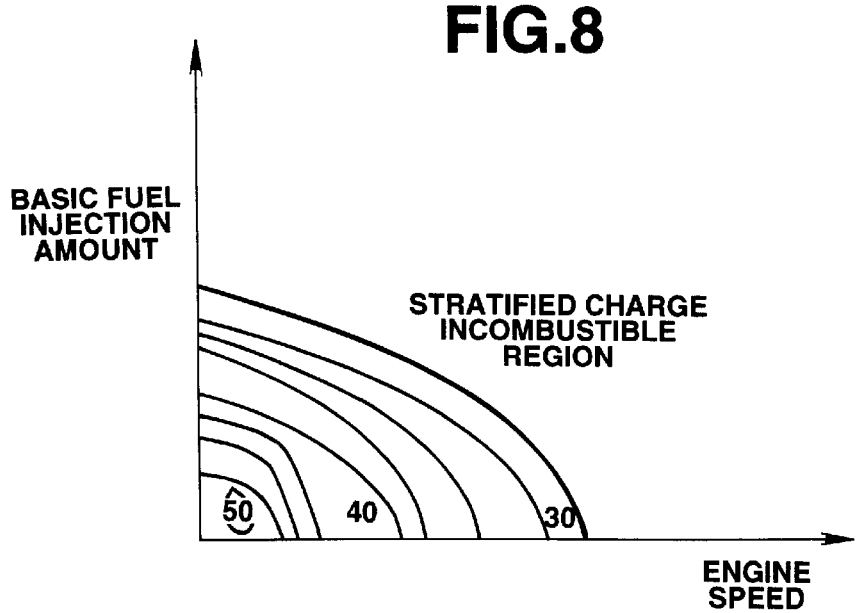
FIG. 8 is a graph showing a lean limit air-fuel ratio for supporting stable combustion of stratified charge, in connection with the control system of FIG. 2.

At a step S340, a lean limit air-fuel ratio for supporting stable combustion of the stratified charge is obtained at the present engine speed Ne, for example, by referring to a map using the basic fuel injection amount as a parameter. An example of such a map is shown in FIG. 8, in which the lean limit air-fuel ratio is represented upon evaluation of stable combustion. It will be understood that the map may be arranged such that the lean limit air-fuel ratio is set upon evaluation of suppressing emission of exhaust gas harmful components such as hydrocarbons in addition to the evaluation of stable combustion. It will be understood that the lean air-fuel ratio is an air-fuel ratio at which fuel is leaner than that at the stoichiometric air-fuel ratio.

At a step S350, a required intake air amount (target intake air amount) tQa is calculated using the basic fuel injection amount Qfcyl of fuel to be desirably injected to each engine cylinder and the lean limit air-fuel ratio tA/F, by the following equation Eq. (1):

$$tQa = Qfcyl \times tA/F \times \text{engine speed } Ne \times k1 \qquad \text{Eq. (1)}$$

where k1 is 6/2/60=0.05 in case of a four-stroke cycle and 6-cylinder engine; and the units used for the equation are tQa (kg/sec), Qfcyl (kg/cyl), and Ne (rpm).

From the above, the required intake air amount tQa is obtained.

Here, the processing of the judgment of the first engine operating condition at the step S130 in FIG. 3 will be discussed in detail.

Comparison is made between Qa-max and tQa. If tQa is not larger than Qa-max, the intake air amount tQa is judged to be suppliable, making such a judgement that the present engine operating condition corresponds to the first engine operating condition.

If tQa is not smaller than Qa-max, air in tQa can not be supplied, and therefore it is judged that the first control cannot be realized. In other words, in accordance with this comparison, judgment is made as to whether the present engine operating condition fall within the first engine operating condition or not.

It will be appreciated that the engine 1 and a throttle valve mechanism (including the throttle valve 4) are slightly not uniform in intake air flowing characteristics among products, and additionally the amount of air flowing through the throttle valve 4 changes with lapse of time owing to adhesion of contaminant or the like. As a result, Qa-max slightly smaller than that of the typical characteristics shown in FIG. 7 may exist. Accordingly, there is the possibility that supply of air in tQa cannot be realized even upon the fact that tQa is smaller than Qa-max. In this regard, it may be proposed to use a judgment manner in which tQa is compared with a value of k2×Qa-max (k2<1.0 where k2 is, for example, 0.8) for the comparison purpose, the value being slightly smaller than Qa-max, thereby accomplishing the judgment at the step S130.

Further, Qa-max in FIG. 7 is in the characteristics at the atmospheric pressure of 1 atm, and therefore this intake air amount in FIG. 7 cannot be necessarily realized even if the throttle valve is fully opened under a condition where the density of air is lowered, for example, in a relatively low atmospheric pressure circumstance such as on a high altitude land or in a relatively high intake air circumstance. In view of this, the following measures will be employed to overcome the above problems: (1) The engine is provided with an atmospheric pressure sensor and an intake air temperature sensor, in which Qa-max is corrected in accordance with the outputs of the sensors. (2) The relationship among the valve opening degree, the engine speed and the intake air amount is successively detected to estimate the density of intake air, in which Qa-max is corrected in accordance with the intake air density. (3) The value of k1 is set upon taking account of also a characteristics change due to change in circumstances.

Here, while the density of intake air has been described as being estimated upon measuring the atmospheric pressure and the intake air temperature at the above (1), it will be understood that the density of intake air may be estimated by a general equation of state of gas. With this, the air flow amount (by volume) as the intake air amount of air throttled by the throttle valve is corrected with a ratio between the estimated intake air density and the intake air density at the normal condition.

Figure 9:
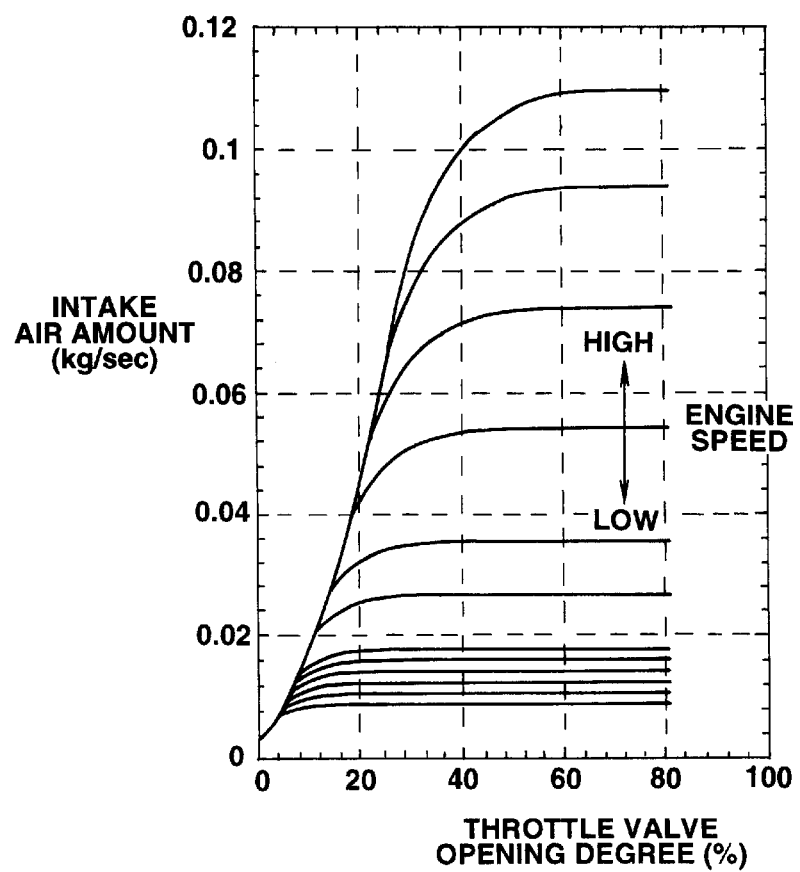
FIG. 9 is a graph showing the characteristics of the intake air amount in terms of a throttle valve opening degree and the engine speed, in connection with the control system of FIG. 2.

There are other manners to realize the steps S120 and S130, which will be discussed hereinafter. Similarly to the processing in a procedure from the step S330 to the step S350, the required intake air amount tQa is calculated. In order to realize this required intake air amount tQa, a required throttle valve opening degree of the throttle valve is calculated (the detailed manner of this calculation will be discussed below). The relationship among the throttle valve opening degree, the engine speed and the intake air amount takes the characteristics shown in FIG. 9, in which throttle valve opening degrees 0% and 100% represent respectively the fully closed and opened states of the throttle valve. FIG. 9 depicts that the intake air amount does not so increase even though the throttle valve opening degree increases when the throttle valve has opened to an extent. Accordingly, a value slightly smaller than the maximum value of the intake air amount based on each engine speed (for example, the value at the throttle valve opening degree of 90%) is used as a threshold value for judging the first engine operating condition, in which judgment is made such that the present engine operating condition falls within the first engine operating condition if the above-mentioned required throttle valve opening degree is smaller than this threshold value. It will be appreciated that the first engine operating condition is restricted to a region where variation in the intake air amount is large relative to operation of the throttle valve. Accordingly, the amount of intake air passing through the throttle valve can be smoothly changed under the operation of the throttle valve.

Figure 10:
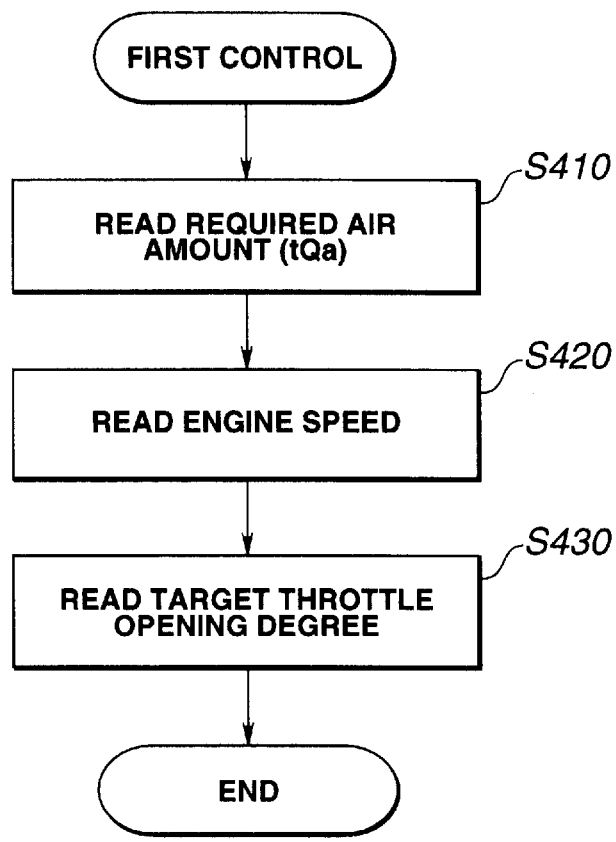
FIG. 10 is a flowchart showing the routine of a first control in the control accomplished by the control system of FIG. 2.

FIG. 10 is the flowchart showing the detail of the first control suitable for the first engine operating condition at the step S140 in FIG. 3.

At a step S410, tQa calculated at the step S350 in FIG. 6 is read.

At a step S420, the engine speed Ne is read.

At a step S430, a target throttle valve opening degree required for obtaining the required intake air amount tQa is read from the map in accordance with the above required air amount tQa and the engine speed Ne, upon which the throttle valve 4 is actuated by operating the throttle actuator 21 so as to take the above-mentioned target throttle valve opening degree. By this, the intake air amount is controlled at the required intake air amount tQa. The map used in this step S430 may be that of FIG. 9.

Figure 11:
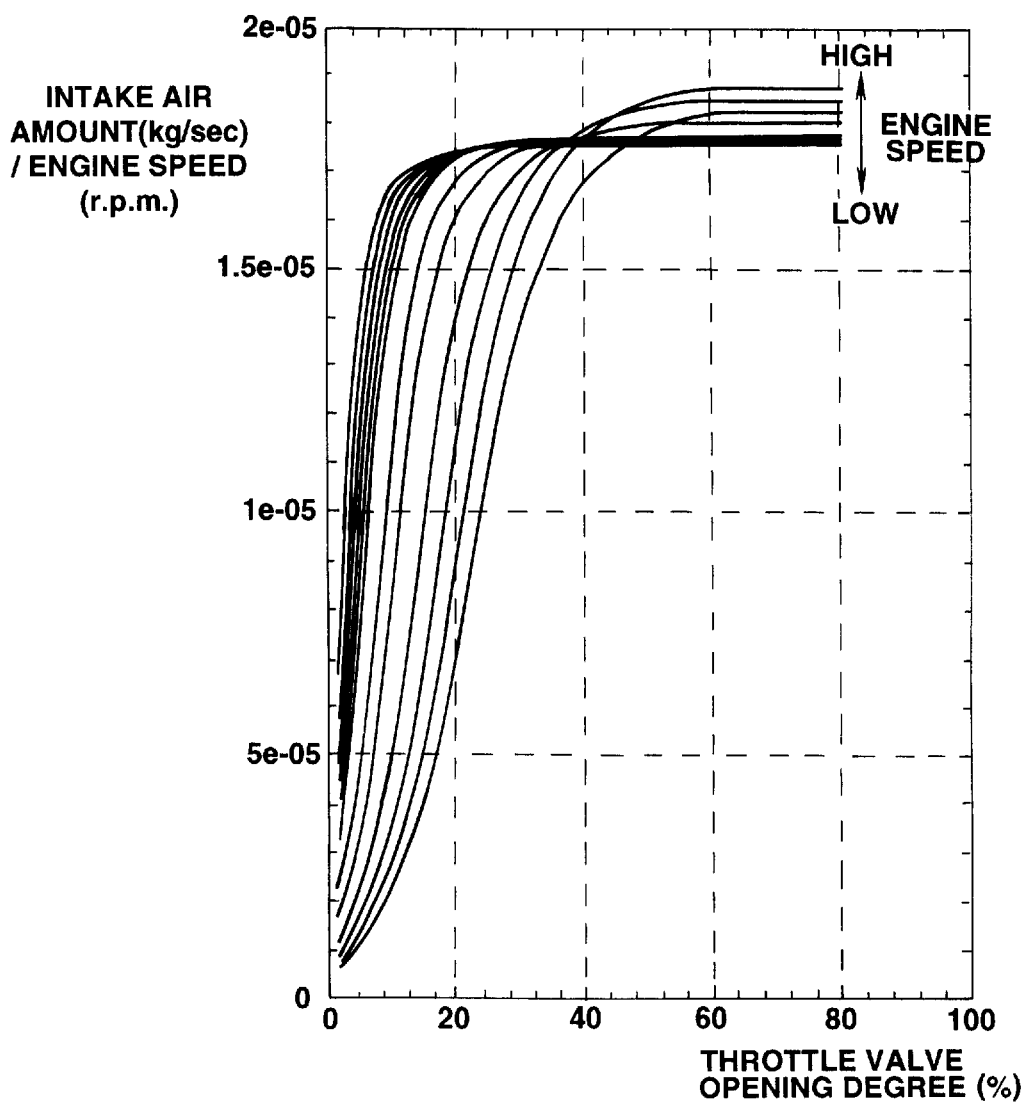
FIG. 11 is a graph showing the characteristics of the intake air amount per engine intake stroke, in connection with the control system of FIG. 2.

In order to accomplish a processing which does not use floating point, the target throttle valve opening degree is determined by using a map of FIG. 11 in place of the map of FIG. 9 because the control precision is lowered at a low engine speed side. In the map of FIG. 11, the value obtained by dividing the target intake air amount by engine speed Ne is used in place of the target intake air amount in the map of FIG. 9. Additionally, the characteristics of the maps of FIGS. 9 and 11 change upon being affected by the atmospheric pressure and the temperature as discussed above, and therefore the characteristics of the maps may be arranged to be corrected with the ratio between the present atmospheric air density estimated and the same density at the normal condition thus improving the precision of intake air control.

Figure 12:
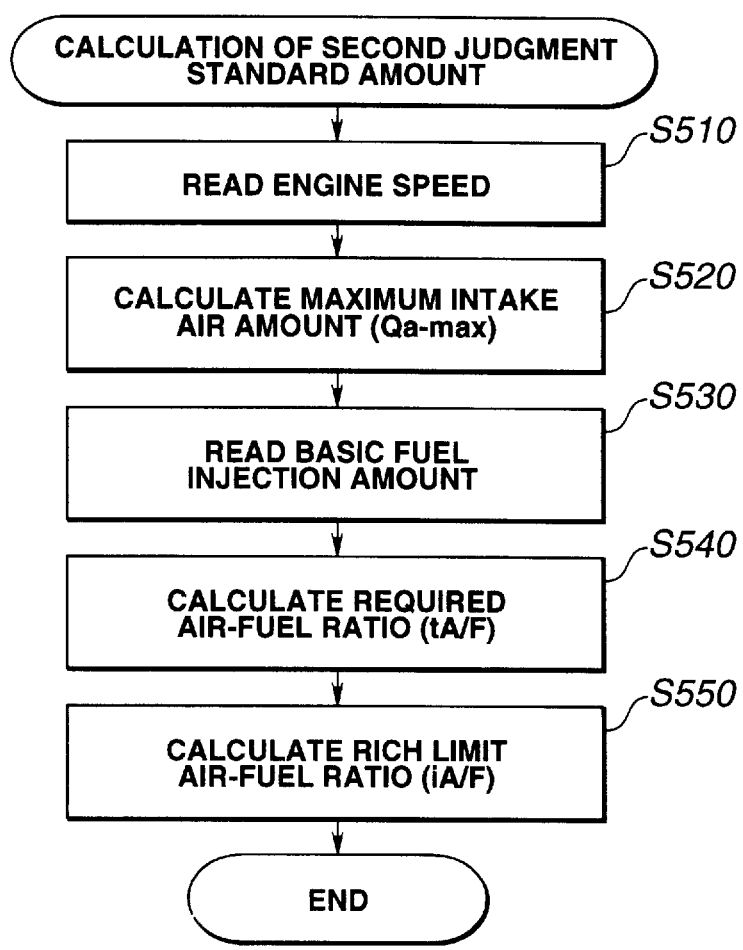
FIG. 12 is a flowchart showing a routine of calculation of a second judgment standard amount in the control accomplished by the control system of FIG. 2.

FIG. 12 is the flowchart showing the detail of calculation of the (second) amount of the second engine operating condition at the step S150 in FIG. 3.

At steps S510, S520 and S530, similarly to the procedure at the steps S310, S320 and S330 in FIG. 6, reading the engine speed Ne, calculating the maximum intake air amount Qa-max and reading the basic fuel injection amount Qfcyl are carried out, respectively.

At a step S540, a required air-fuel ratio rA/F is calculated. The required air-fuel ratio rA/F corresponds to a value obtained upon supply of intake air in the amount of Qa-max and injection of fuel in the amount of Qfcyl.

The required air-fuel ratio rA/F is calculated by the following equation Eq. (2):

$$rA/F = Qfcyl/(Qa\text{-max}/\text{engine speed } Ne/kl) \qquad \text{Eq. (2)}$$

where kl is indicated in Eq. (1). It will be understood that Eq. (2) is obtained by modifying Eq. (1).

At a step S550, a rich limit air-fuel ratio iA/F in the present engine operating condition is calculated. The rich limit air-fuel ratio iA/F is determined from a map similar to that in FIG. 8, in which the map may indicate a rich air-fuel ratio value as a limit over which stable combustion is impossible. The map has been previously prepared by using experimentally obtained data. A typical example of setting the rich limit air-fuel ratio is as follows: If the fuel injection amount is increased while maintaining combustion of the stratified charge, the air-fuel ratio of the air-fuel mixture layer except for the air layer becomes excessively rich though the average air-fuel ratio throughout the whole combustion chamber is lean, so that combustion in the combustion chamber becomes unstable. The air-fuel ratio limit (at the rich side) outside which stable combustion cannot be supported is set as the rich air-fuel ratio limit in the map. It will be understood that the rich air-fuel ratio represents an air-fuel ratio at which fuel is richer than that at the stoichiometric air-fuel ratio.

Subsequently, at the step S160 in FIG. 3, comparison is made between the above-mentioned required air-fuel ratio rA/F and the rich limit air-fuel ratio. If rA/F is leaner than iA/F, the flow goes to the step S170 at which the second control suitable for the second engine operating condition is accomplished. If not, the present engine operating condition is so judged as to fall within the third engine operating condition.

Figure 15:
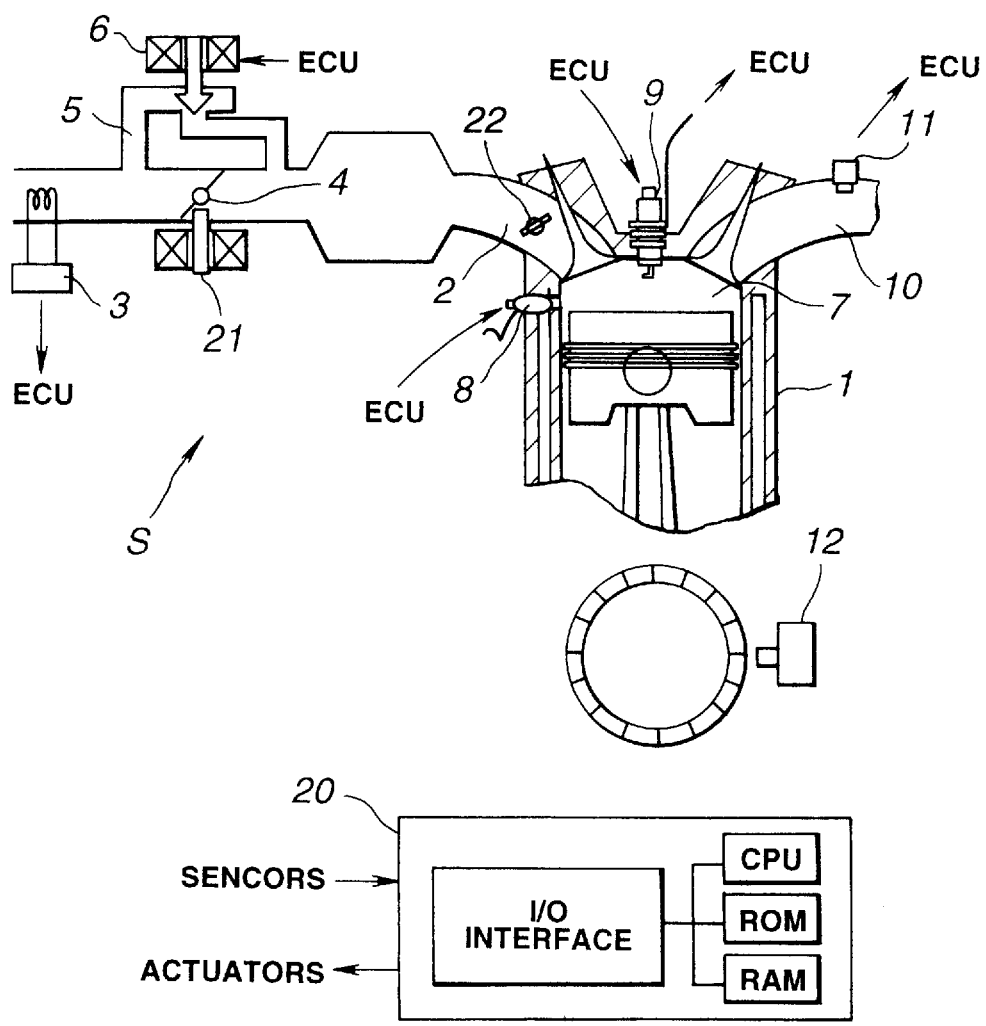
FIG. 15 is a fragmentary schematic illustration similar to FIG. 1 but showing another embodiment of the control system according to the present invention.

The processing made at the above step S170 will be discussed. At this step, the target throttle valve opening degree is set such that the intake air amount merely becomes Qa-max. More specifically, the target throttle valve opening degree is set similarly to that in the flowchart of FIG. 10 where tQa is replaced with Qa-max. By this, the intake air amount is controlled at the maximum intake air amount Qa-max. However, the intake air amount Qa-max may be at a level which is lower, by a predetermined amount, than Qa-max in the case that an actuator to be operated by a vacuum of the intake air is disposed in the control system S. The actuator may be for operating, for example, a swirl control valve 22 as shown in FIG. 15. It will be understood that if the maximum intake air amount Qa-max is supplied to the combustion chambers of the engine, no intake manifold vacuum is generated thereby making it impossible to operate the actuator. In this regard, the above predetermined amount in intake air amount corresponds, for example, to an intake manifold vacuum of 100 mmHg.

Figure 13:
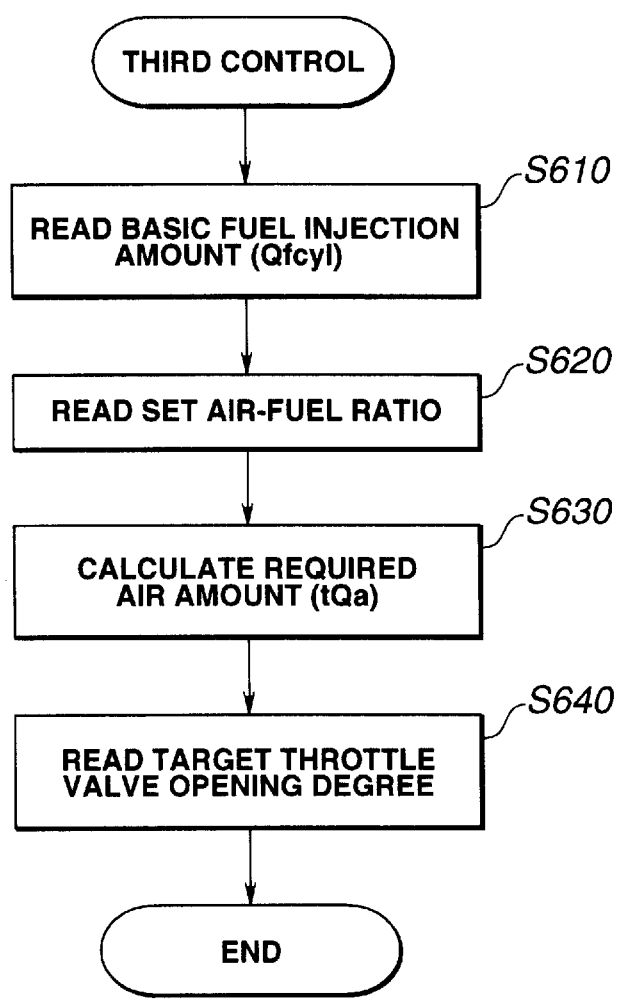
FIG. 13 is a flowchart showing a routine of a third control in the control accomplished by the control system of FIG. 2.

FIG. 13 is the flowchart showing the detail of the third control at the step S180 in FIG. 3.

At a step S610, the basic fuel injection amount Qfcyl is read.

At a step S620, the air-fuel ratio tA/F set at the present engine operating condition is read from a map which is, for example, a previously set air-fuel ratio map for a usual lean burn engine, the map being arranged taking account of stable combustion in the combustion chamber and NOx emission upon the homogenous air-fuel mixture combustion. It will be understood that formation of the homogenous air-fuel mixture is accomplished, for example, by advancing the fuel injection timing of the fuel injector valve as compared with formation of the stratified charge.

At a step S630, the required air amount tQA is calculated in accordance with the basic fuel injection amount Qfcyl and the set air-fuel ratio tA/F, by using the above-mentioned equation Eq. (1).

At a step S640, the target throttle valve opening degree is read similarly to that at the step 430 in order to realize the above-mentioned required air amount tQA.

Then, the throttle actuator 21 is operated to control the throttle valve in such a manner that the actual throttle opening degree becomes the target throttle valve opening degree as obtained above.

The control system of the above embodiment has been shown and described such that the target throttle valve opening degree is calculated directly for the required air amount. However, in general, the intake air amount of air to be sucked into the engine cylinder changes with a delay relative to operation of the throttle valve, owing to dynamics in the intake system of the engine. In view of this, the target throttle valve opening degree may be set upon making a so-called phase delay compensation for the purpose of minimizing the delay.

Figure 14:
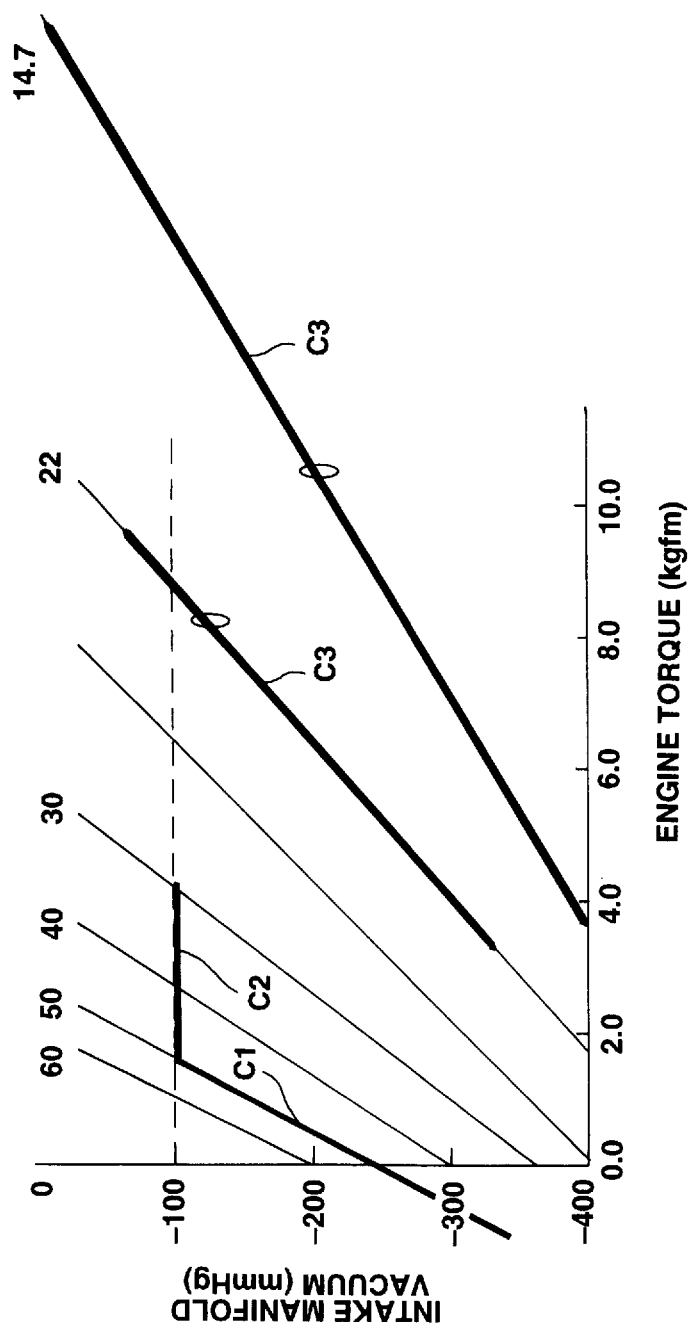
FIG. 14 is a graph showing an example of the control accomplished by the control system of FIG. 2, indicating first, second and third engine operating conditions used in the control.

FIG. 14 is a graph showing an example of control accomplished by the control system S of the above embodiment. FIG. 14 depicts the first, second and third engine operating conditions or regions which are respectively indicated by C1, C2 and C3, in terms of the intake air amount or intake manifold vacuum (mmHg), engine torque (kgfm) and air-fuel ratio (air/fuel). In this graph, the first engine operating condition or region C1 extends along the lean limit air-fuel ratio of 50 (air/fuel). The second engine operating range or region C2 has the intake air amount or a value obtained by subtracting a predetermined value from the maximum intake air amount, changing the air-fuel ratio. The third engine operating condition or region C3 includes, in this example, a first status at the air-fuel ratio 22 (air/fuel) and a second status at the stoichiometric air-fuel ratio 14.7 (air/fuel). It will be understood that combustion of the stratified charge (air-fuel mixture) is accomplished within the first and second engine operating conditions C1, C2, while combustion of the homogeneous charge (air-fuel mixture) is accomplished within the third engine operating condition C3.

Figure 16:
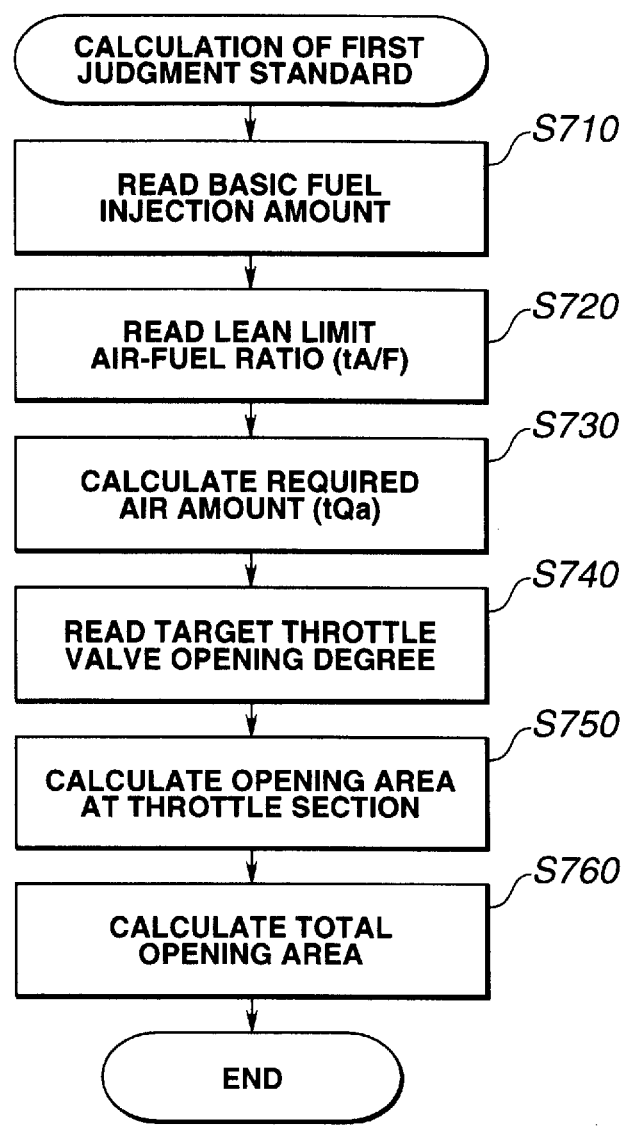
FIG. 16 is a flowchart showing a routine of calculation of the first judgment amount in the control accomplished by the control system of FIG. 15.

FIGS. 15 and 16 illustrate another embodiment of the control system according to the present invention, similar to the above-discussed embodiment of FIGS. 2 to 14. In this embodiment, the swirl control valve 22 is disposed in an intake port (not identified) forming part of the air intake passage 2 to generate, for example, swirl or tumble stream of air-fuel mixture in the combustion chamber, so that the swirl control valve 22 is operated to effectively burn lean air-fuel mixture or stratified charge (air-fuel mixture). Accordingly, when the intake air amount is relatively small, the intake air throttling action of the throttle valve 4 is predominant so as to obtain the intake air amount characteristics as shown in FIGS. 9 and 11. However, the intake air throttling action of the swirl control valve 22 becomes predominant when the throttle valve 4 has opened to some extent. Under the above premise, in this embodiment, the judgment of the first operating condition at the step S130 of FIG. 3 is accomplished through a processing discussed hereinafter.

Calculation of the (first) judgment standard amount of the first operating condition at the step S120 in FIG. 3 is made according to the flowchart of FIG. 16.

At a step S710, the basic fuel injection amount Qfcyl is read.

At a step S720, the lean limit air-fuel ratio for supporting stable combustion of the stratified charge is obtained at the present engine speed Ne in a similar manner to that at the step S340 in FIG. 6.

At a step S730, the required intake air amount tQA is calculated in accordance with the basic fuel injection amount Qfcyl and the set air-fuel ratio tA/F, by using the above-mentioned equation Eq. (1).

At a step S740, the target throttle valve opening degree is read similarly to that at the step 430 in order to realize the above-mentioned required intake air amount tQA.

At a step S750, an opening area of the air intake passage 2 at throttle sections each having the throttle valve 4 is calculated in accordance with the obtained target throttle valve opening degree. More specifically, the opening area is calculated, for example, upon searching a table setting the previously calculated relationship between the throttle valve opening degree and the opening area.

At a step S760, a total opening area of the air intake passage is calculated by adding other opening areas (for example, those causing various air leaks) to the above opening area.

This total opening area is compared with the total of respective opening areas each of which is in the intake port at the swirl control valve 22. If the total opening area is smaller than the total, the present engine operating condition is so judged as to be within the first engine operating condition.

Otherwise, the above total opening area may be compared with a value which is obtained by multiplying the above-mentioned total by a predetermined correction coefficient smaller than 1.

In order to further improve the precision of control, two kinds of characteristics maps (for the intake air amount in terms of the throttle valve opening degree and the engine speed) similar to the map of FIG. 9 may be prepared. The respective maps correspond respectively to an engine operating condition in which the swirl control valve 22 is opened and another engine operating condition in which the swirl control valve 22 is closed, so that searching is made on one of the maps in accordance with the present engine operating condition. This makes it possible to accomplish the following control within a predetermined engine operating range in which the swirl control valve 22 is operated to provide a flow movement to the air-fuel mixture within the combustion chamber by restricting flow of intake air in a part of the air intake passage communicable with the combustion chamber: The maximum intake air amount Qa-max is corrected to obtain a new maximum intake air amount, and an amount of control for an intake air amount regulating device (such as the throttle actuator 21) is corrected corresponding to the target intake air amount tQa.

Figure 17:
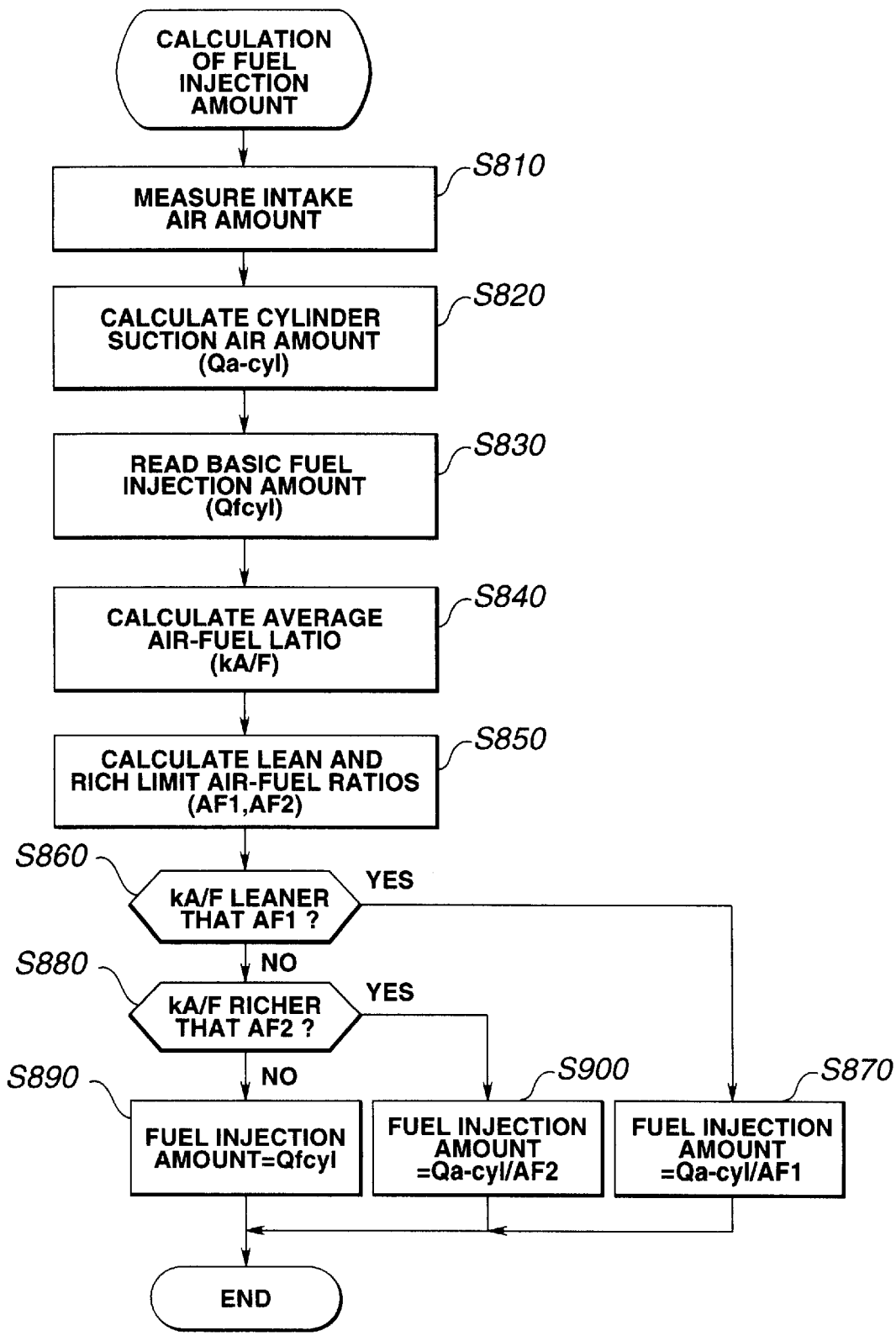
FIG. 17 is a flowchart showing a routine of calculation of a fuel injection amount in a control accomplished by a further control system according to the present invention.

FIG. 17 illustrates a further embodiment of the control system according to the present invention, which is similar to the embodiment of FIGS. 2 to 14.

It will be appreciated that the necessary intake air amount is obtained by operating the throttle valve 4 in the control of FIG. 3. Here, the throttle valve 4 is moved at a speed under mechanical operation and motor operation characteristics and therefore cannot be moved in a moment to take the target throttle valve opening degree. Additionally, also in case of making the phase delay compensation under the dynamics in the intake system, an actual cylinder suction air amount (the amount of air to be sucked into each cylinder) cannot reach a target suction air amount in a moment. Accordingly, assuming that fuel in the basic fuel injection amount Qfcyl is injected continuously, the air-fuel ratio shifts from the desired air-fuel ratio by an amount corresponding to the difference of the actual cylinder suction air amount from the target cylinder suction air amount. If such a shifted air-fuel ratio is leaner than over the lean limit air-fuel ratio, combustion stability and exhaust gas purification performance are affected thereby providing the possibility of misfire occurring.

Under the above circumstance, according to this embodiment, a processing of the flowchart shown in FIG. 17 is carried out.

At a step S810, the intake air amount per unit time is measured by the air flow meter 3.

At a step S820, the cylinder suction air amount Qa-cyl is calculated upon making the phase delay compensation. It will be understood that the procedures at the steps S810 and S820 are carried out also in a control for a usual internal combustion engine.

At a step S830, the basic fuel injection amount Qfcyl is read as discussed above. At this time, the required fuel injection amount for the required torque is reduced by an amount corresponding to lowering in pumping loss due to increasing the intake air amount during combustion of lean air-fuel mixture. Accordingly, the basic fuel injection amount may be corrected to be reduced by an amount corresponding to the reduction of the required fuel injection amount.

At a step S840, an average air-fuel ratio kA/F within the combustion chamber is calculated from Qa-cyl, Qfcyl and the engine speed Ne, according to an equation similar to the equation Eq. (2).

At a step S850, the lean limit air-fuel ratio AF1 (tA/F) and the rich limit AF2 (iA/F) are calculated in the present engine operating condition. The limits AF1, and AF2 are the same as those obtained respectively at the above-mentioned step S340 and the above-mentioned step S550.

At the step S860, the above average air-fuel ratio kA/F is compared with the lean limit air-fuel ratio AF1. If the average air-fuel ratio is leaner than the lean limit air-fuel ratio, it is judged that suitable combustion cannot be supported, and therefore the flow goes to a step S870.

At a step S870, the cylinder suction air amount is divided by the lean limit air-fuel ratio AF1 so as to obtain the fuel injection amount to realize the lean limit air-fuel ratio.

If the average air-fuel ratio kA/F is judged to be not leaner than the lean limit air-fuel ratio AF1 at the step S860, the flow goes to a step S880.

At the step S880, the average air-fuel ratio kA/F is compared with the rich limit air-fuel ratio AF2. If the average air-fuel ratio is richer than the rich limit air-fuel ratio, it is judged that suitable combustion cannot be supported, and therefore the flow goes to a step S900.

At a step S900, the cylinder suction air amount is divided by the rich limit air-fuel ratio AF2 so as to obtain the fuel injection amount to realize the rich limit air-fuel ratio.

If the average air-fuel ratio kA/F is judged to be not richer than the rich limit air-fuel ratio AF2, it is confirmed that the average air-fuel ratio kA/F is within an allowable air-fuel ratio range, and therefore the flow goes to a step S890.

At the step S890, the fuel injection amount Qfcyl read at the step S830 or a fuel injection amount obtained by making a reduction-correction for the pumping loss is set.

There is a case in which fuel injection is required to be made by taking account of exhaust gas purifying performance prior to the follow-up performance of the generated engine torque to the required engine torque. In such a case, it is sufficient that the fuel injection amount is set to obtain the set air-fuel ratio relative to the cylinder suction air amount Qa-cyl.

What is claimed is:

1. A control system for an internal combustion engine having an air intake system and a fuel supply device, comprising:

a control unit configured to perform controlling an intake air amount of intake air to be supplied to a combustion chamber of the engine through the intake system and a fuel supply amount of fuel to be supplied to the combustion chamber through the fuel supply device so as to realize an air-fuel ratio in the vicinity of a lean limit air-fuel ratio, within a first engine operating condition which is within a predetermined low range in engine speed and low in engine load, wherein stable combustion in the combustion chamber is impossible at the air-fuel ratio leaner than the lean limit air-fuel ratio; and controlling the intake air amount to increase to fall within a high range between the maximum level and a level lower, by a predetermined amount, than the maximum level and controlling the fuel supply amount so that the air-fuel ratio falls within a predetermined range, within a second engine operating condition which is higher in at least one of engine speed and engine load than the first engine operating condition.

2. A control system as claimed in claim 1, wherein the control unit is further configured to perform controlling the intake air amount and the fuel supply amount so as to realize a value of the air-fuel ratio set in accordance within a third engine operating condition, which third engine operating condition is higher in at least one of engine speed and engine load than the second engine operating condition.

3. A control system for an internal combustion engine having an intake air amount regulating device and a fuel supply device, comprising:

means for detecting an engine operating condition of the engine; and a control unit configured to perform (a) calculating a basic fuel supply amount of fuel to be supplied to a combustion chamber of the engine in accordance with the engine operating condition;

(b) calculating a lean limit air-fuel ratio in accordance with the engine operating condition, stable combustion in the combustion chamber being impossible at the air-fuel ratio leaner than the lean limit air-fuel ratio;

(c) calculating a target intake air amount of intake air to be supplied to the combustion chamber, required for meeting the basic fuel supply amount and the lean limit air-fuel ratio;

(d) controlling the intake air amount regulating device so as to regulate an intake air amount of the intake air to the target intake air amount and controlling the fuel supply device so as to regulate a fuel supply amount of the fuel to realize the lean limit air-fuel ratio, within a first engine operating condition which is within a predetermined low range in engine speed and in engine load; and (e) controlling the intake air amount regulating device so as to increase the intake air amount to fall within a high range between the maximum level and a level lower, by a predetermined amount, than the maximum level and controlling fuel supply device so as to supply the fuel such that the air-fuel ratio falls within a predetermined range, within a second engine operating condition which is higher in at least one of engine speed and engine load than the first engine operating condition.

4. A control system as claimed in claim 3, wherein said control unit is further configured to perform controlling the intake air amount regulating device so as to regulate the intake air amount to the maximum level within the second engine operating condition.

5. A control system as claimed in claim 4, wherein said control unit is further configured to perform controlling the intake air amount regulating device so as to restrict the intake air amount to the level lower than the maximum level, under a predetermined condition.

6. A control system as claimed in claim 5, wherein the predetermined condition is a condition where an actuator to be operated by a vacuum of the intake air is disposed in the control system.

7. A control system as claimed in claim 3, wherein the predetermined range of the air-fuel ratio allows stable combustion to be achieved in the combustion chamber and causes an emission amount of an exhaust gas harmful component to be lowered than a standard value.

8. A control system as claimed in claim 3, wherein the control unit is further configured to perform setting the air-fuel ratio in accordance with the engine operating condition, within a third engine operating condition which is higher in at least one of engine load and engine speed than the second engine operating condition; and controlling the intake air regulating device and the fuel supply device to regulate the intake air amount and the fuel supply amount so as to obtain the set air-fuel ratio, within the third engine operating condition.

9. A control system as claimed in claim 3, wherein the engine is arranged to form a stratified charge of the air-fuel mixture in the combustion chamber, wherein the control unit is further configured to perform combustion of the stratified charge within the combustion chamber, within the first and second engine operating conditions.

10. A control system as claimed in claim 3, wherein the control unit is further configured to perform forming a homogeneous charge of the air-fuel mixture and combustion of the homogeneous charge within the combustion chamber, within the third engine operating condition.

11. A control system as claimed in claim 3, wherein the intake air amount regulating device includes a throttle valve disposed in an intake system of the engine, wherein the control unit is further configured to perform controlling the throttle valve to realize the target air intake amount.

12. A control system as claimed in claim 3, wherein the control unit is further configured to perform calculating a required engine torque which is required in accordance with the engine operating condition, and calculating the basic fuel supply amount in accordance with the required engine torque.

13. A control system as claimed in claim 8, wherein the engine operating condition detecting means includes means for detecting the intake air amount, wherein the control unit is further configured to control the fuel supply amount so as to realize one of the lean limit air-fuel ratio and the set air-fuel ratio relative to the detected intake air amount.

14. A control system as claimed in claim 3, wherein the control unit is further configured to perform calculating a maximum intake air amount of the intake air in accordance with the engine operating condition, and defining the first engine operating condition in which the calculated target intake air amount is smaller than one of the calculated maximum intake air amount and a value which is smaller by a predetermined amount than the calculated maximum intake air amount.

15. A control system as claimed in claim 14, wherein the control unit is further configured to perform calculating a maximum intake air amount of the intake air in accordance with the engine operating condition, and defining the second engine operating condition in which the air-fuel ratio is within a predetermined range, the air-fuel ratio being calculated from the basic fuel supply amount and one of the maximum intake air amount and a value which is smaller by a predetermined amount than the maximum intake air amount.

16. A control system as claimed in claim 15, wherein the engine includes means for providing a flow movement to the air-fuel mixture within the combustion chamber by restricting flow of intake air in a part of an air intake passage communicable with the combustion chamber, within a predetermined engine operating range, wherein the control unit is further configured to perform calculating a value by correcting the maximum intake air amount within the predetermined engine operating range, and correcting an amount of control to the intake air amount regulating device in accordance with the target intake air amount within the predetermined engine operating range.

17. A control system as claimed in claim 15, wherein the control unit is further configured to perform detecting a density of intake air to be supplied to the combustion chamber, correcting the maximum intake air amount in accordance with the intake air density, and correcting an amount of control to the intake air amount regulating device in accordance with the intake air density.

* * * * *